United States Patent [19]

White, Jr.

[11] Patent Number: 5,018,432
[45] Date of Patent: May 28, 1991

[54] HYDROSTATIC STEERING DEVICE WITH A RADIALLY FREE FLOATING VALVE MEMBER

[76] Inventor: Hollis N. White, Jr., 243 Pyle La., Hopkinsville, Ky. 42240

[21] Appl. No.: 346,990

[22] Filed: Jun. 15, 1989

Related U.S. Application Data

[62] Division of Ser. No. 170,675, Mar. 17, 1988, Pat. No. 4,858,714.

[51] Int. Cl.⁵ ............................ B62D 5/06; F15B 9/10
[52] U.S. Cl. ................................ 91/375 R; 91/391 R; 137/625.21; 180/132; 180/149
[58] Field of Search .................... 91/375 R, 391 R; 137/625.21; 180/132, 148, 149

[56] References Cited

U.S. PATENT DOCUMENTS

| | | | |
|---|---|---|---|
| 1,876,104 | 9/1932 | Tucker | 91/375 R |
| 3,190,313 | 6/1965 | Rumsey | 91/375 |
| 4,057,079 | 11/1977 | Taig | 91/375 R |
| 4,415,002 | 11/1983 | Taig | 91/375 R |
| 4,428,399 | 1/1984 | Masuda et al. | 91/375 R |

Primary Examiner—John J. Vrablik
Attorney, Agent, or Firm—Woodling, Krost & Rust

[57] ABSTRACT

A hydrostatic steering valve utilizing a shaft mounted valve seat and a surrounding valve member which has no physical impediments such as a bearing or seal surrounding the valve member so as to allow the valve member to float with the valve seat totally unimpeded.

25 Claims, 4 Drawing Sheets

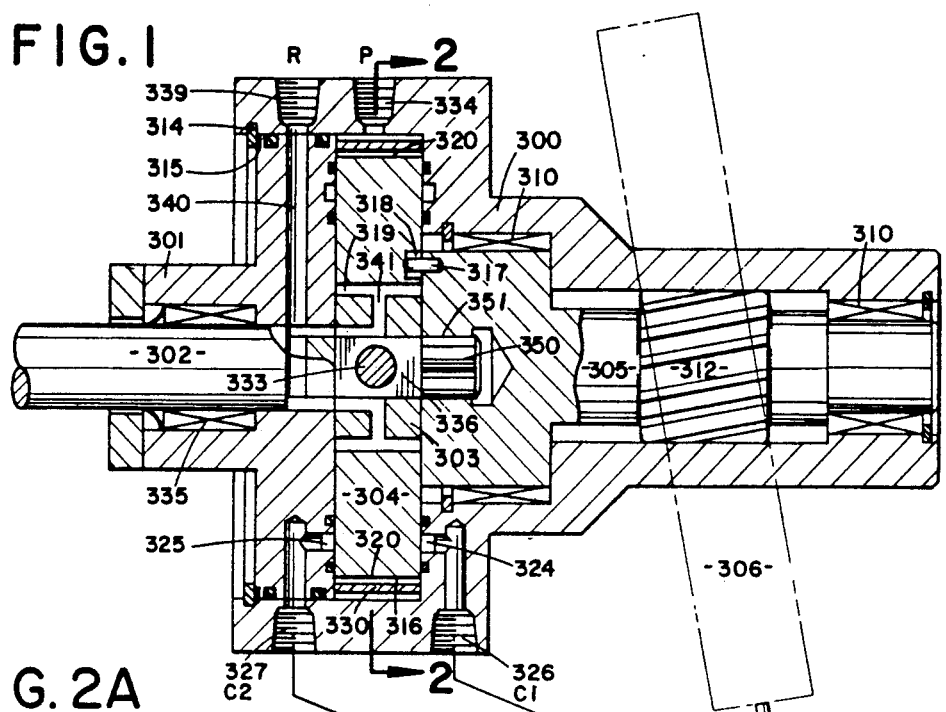
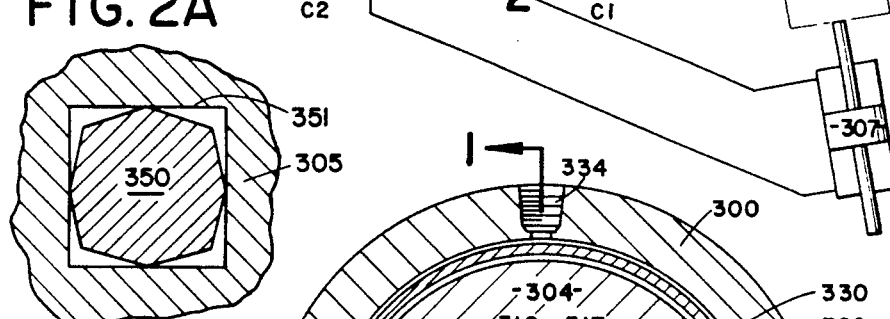
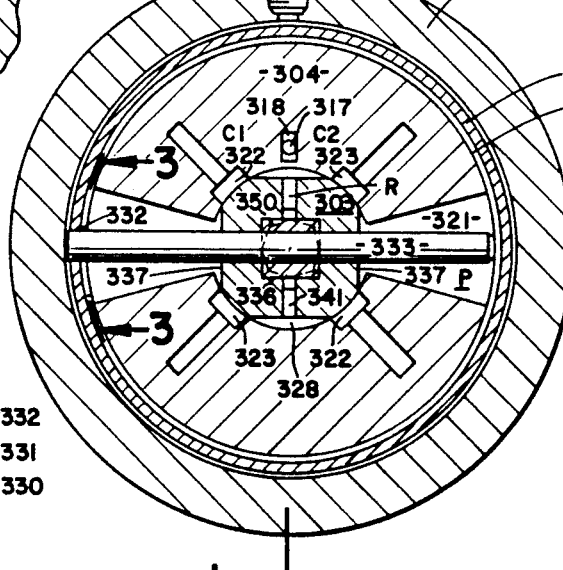
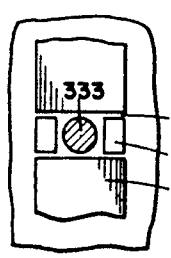
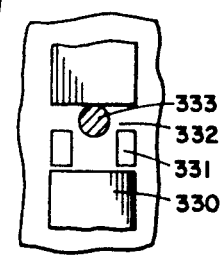

HYDROSTATIC STEERING DEVICE WITH A RADIALLY FREE FLOATING VALVE MEMBER

This present application is a division of U.S. application Ser. No. 170,675, filed Mar. 17, 1988, now U.S. Pat. No. 4,858,714, issued Aug. 29, 1989.

This invention relates to an improved power steering device.

It is an object of this invention to reduce the physical size of hydrostatic steering devices.

It is an object of this invention to simplify the construction of hydrostatic steering devices.

It is an object of this invention to increase the the strength of hydrostatic steering devices.

It is an object of this invention to reduce the cost of hydrostatic steering devices.

A star-pointed annulus increases commutation fluid flow.

Other objects and advantages of the present invention will be apparent from the accompanying description and drawings in which:

FIG. 1 is a central longitudinal cross-sectional view through the hydrostatic rack and pinion steering device taken along lines 1—1 in FIG. 2.

FIG. 2 is a cutaway cross-sectional view of the device of FIG. 1 taken generally along lines 2—2 of that figure.

FIG. 2A is a detail of the safety interconnect of the device of FIG. 1.

FIGS. 3 and 4 are partial sectional views of the torsion connection of the device of FIG. 1 taken generally along lines 3—3 in FIG. 2.

Figure 5:
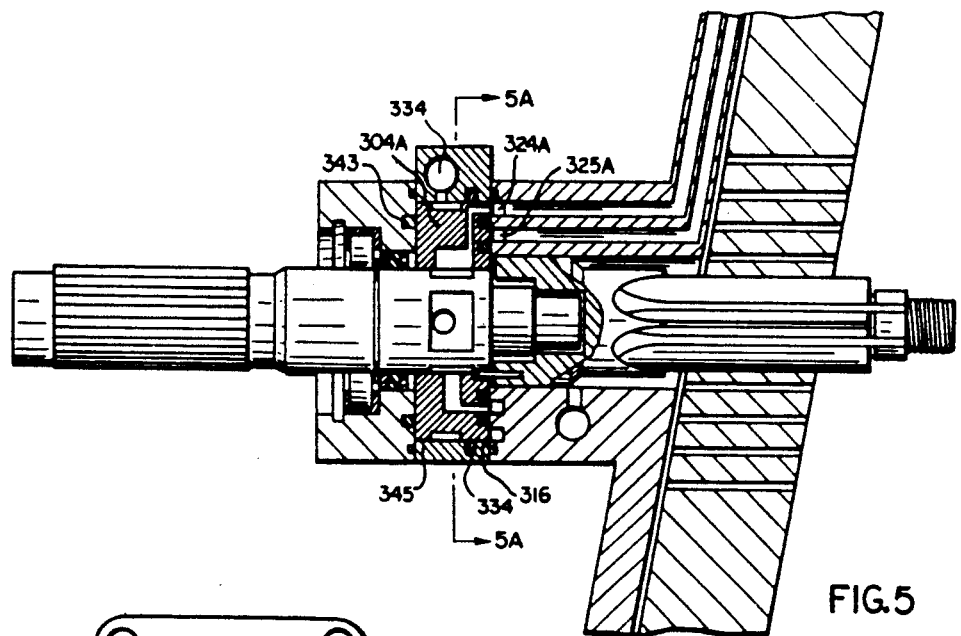
Figure 5A:
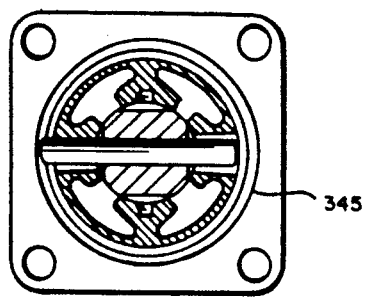
Figure 6:
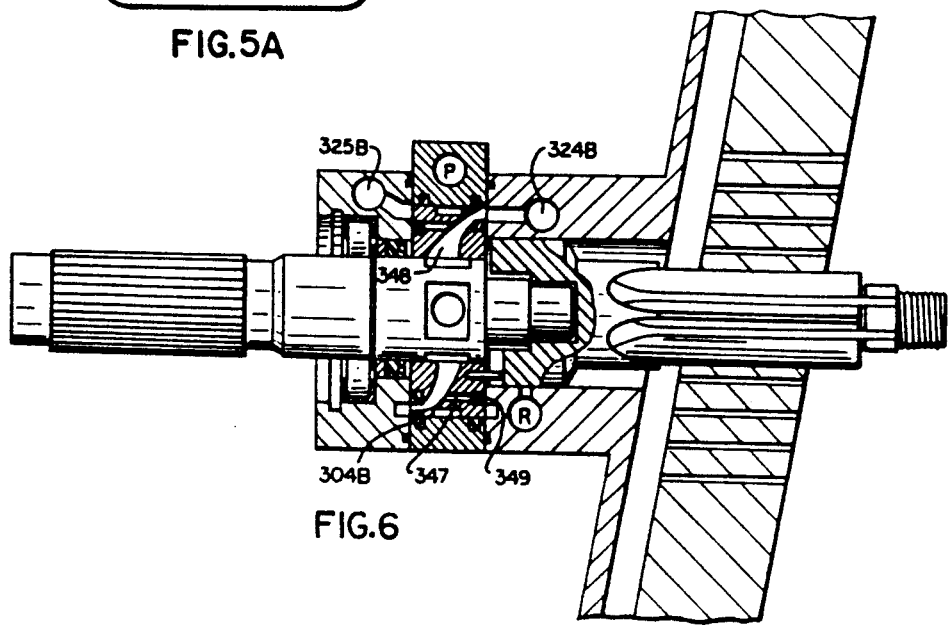

FIGS. 5 and 6 central longitudinal cross-sectional views of hydrostatic rack and pinion steering devices like FIG. 1 utilizing pressure balancing and integral passage features. FIG. 5A is a cross sectional view of the device of FIG. 5 taken generally along the lines indicated in that figure.

Figure 7:
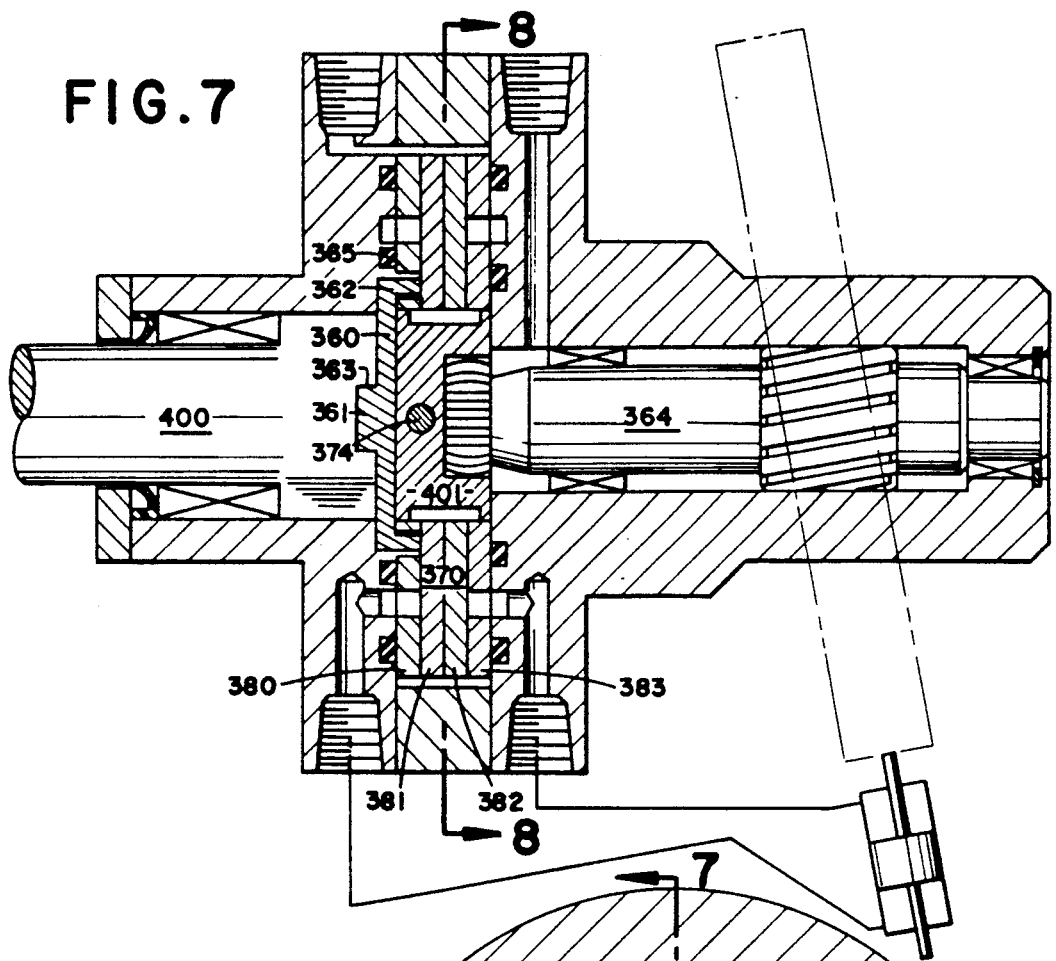

FIG. 7 is a central longitudinal cross-sectional view of a hydrostatic rack and pinion steering device like FIG. 1 with an alternate type of construction. The view is taken along lines 7—7 in FIG. 8.

Figure 8:
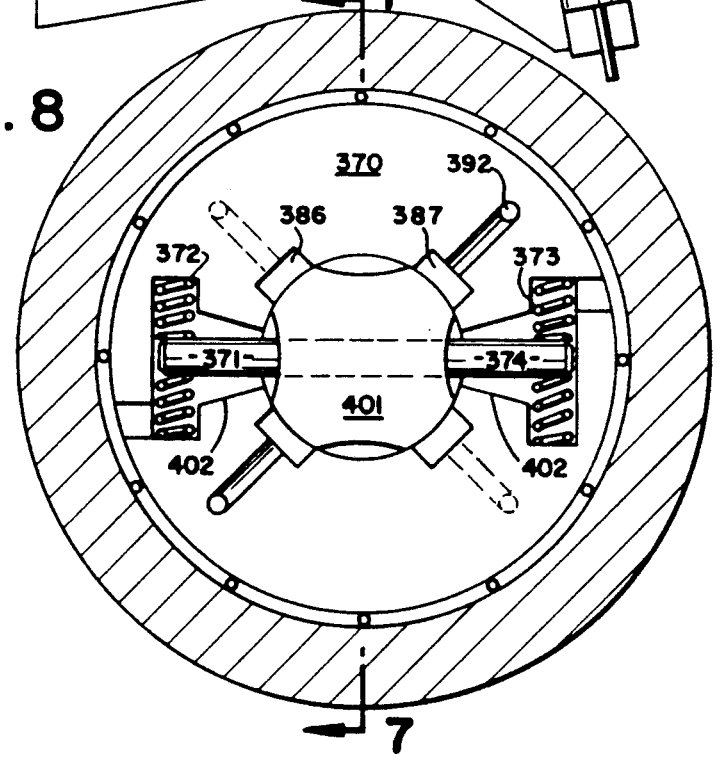
Figure 9:
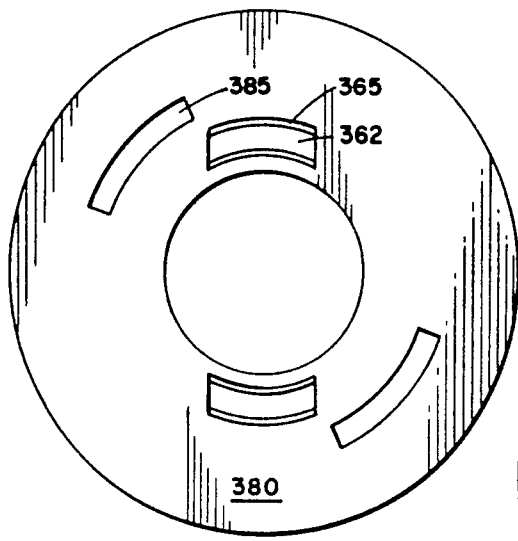
Figure 10:
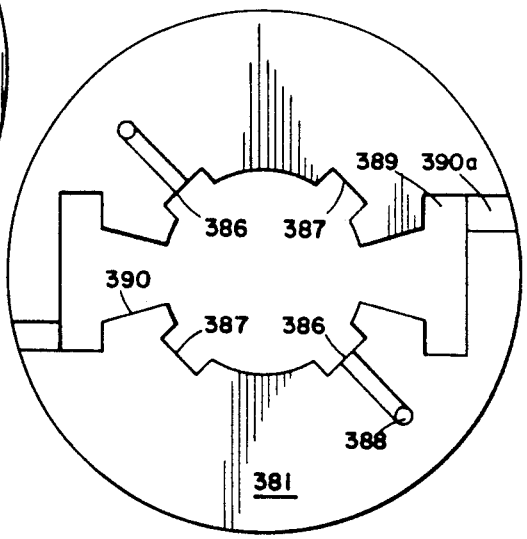
Figure 11:
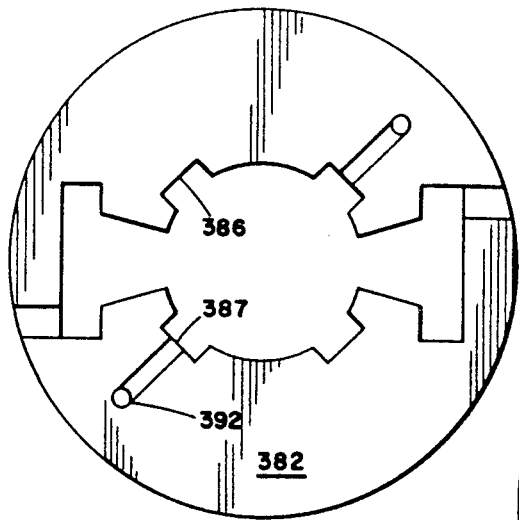
Figure 12:
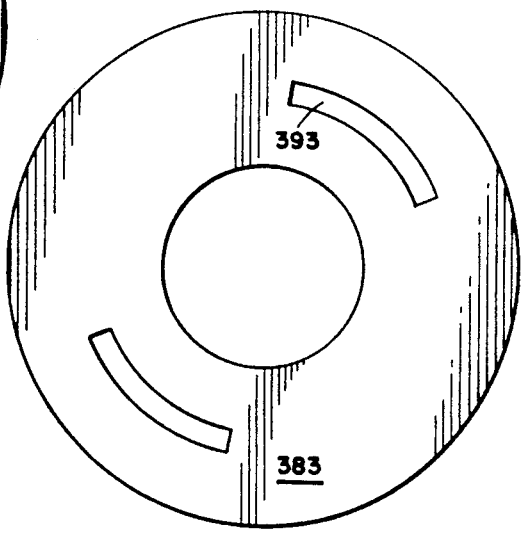

FIG. 8 is a cutaway cross-sectional view of the device of FIG. 7 taken generally along lies 8—8 of that figure.

FIGS. 9-12 are sequential views of the laminated rotor of the device of FIG. 7.

Referring now to FIG. 1, the improved heavy pin hydrostatic steering device includes a body 300, an insert 301, a drive shaft 302, a valve seat 303, a valve member 304, a pinion shaft 305, a rack 306 and a cylinder 307. The body 300 and insert 301 are formed of cast steel.

The pinion shaft 305 is rotatably mounted within the body 300 of the device by bearings 310. The pinion 312 of the pinion shaft 305 engages the rack 306 of the steering device. The insert 301 is mounted within the other end of the body 300 of the device A snap ring 314 holds the insert 301 within the body 300 of the device A wave spring 315 provides pressure on both sides of the valve member 304 captured between the insert 301 and body 300 of the device.

The valve member 304 is captured in a valve cavity 316 between the insert 301 and the body 300 of the device. The valve member 304 is rotatably connected to the pinion shaft 305 via small pin 317. The small pin 317 is fixedly connected to the pinion shaft 305 for rotation therewith. The pin 317 engages the valve member 304 in a radially extending slot 318. This slot allows the valve member 304 to float in respect to the pinion shaft 305 while at the same time rotating therewith (i.e. the rotational axis of the pinion shaft 305 need not correspond to the rotational axis of the valve member 304).

The valve member 304 has a central core 319, an outer diameter 320 and a drive cavity 321. Two pairs of symmetrically placed valving passages C1(322), C2(323) lead from the central core 319 of the valve member 304 to the facing surfaces of the valve cavity 316 from whence they communicate through two circular grooves 324, 325 in the body 300 and insert 301 of the device and two ports 326, 327 in the body 300 of the device to opposing sides of the cylinder 307. A "C" shaped torsion member 330 surrounds the outer diameter 320 of the valve member 304. Two small tabs 331 extending off of the valve member 304 extend into the opening 332 of the "C" shaped torsion member 330 (for reasons to be later described) The drive cavity 321 extends generally butterfly shaped through the central part of the valve member 304. The drive cavity 321 allows clearance for the movement of the heavy pin 333 (as will be later described). The drive cavity 321 also is the fluid passageway between the pressure port 334 in the body of the device and the valve (again to be later described).

The drive shaft 302 is rotatably mounted to the insert 301 of the device by bearing 335. The valve seat 303 is located within the central core 319 of the valve member 304 fixedly connected on a square section 336 of the drive shaft 302 for rotation therewith. The valve seat 303 includes a pair of opposed pressure grooves 337 (fed by the pressure port 334 through the drive cavity 321 of the valve member 304) and a pair of opposed return grooves 338 (fed from the return port 339 through passageway 340 in the insert 301 and the hole 341 through the valve seat 303).

The heavy pin 333 extends through the square section 336 of the drive shaft 302, the valve seat 303 and the drive cavity 321 into the opening 332 in the "C" shaped torsion member 330. The heavy pin 333 and torsion member 330 provide the torsion connection of the device. A separate cutaway square shaped point 350 on the drive shaft 302 fits into a square shaped hole 351 in the pinion shaft 305 to provide for the safety interconnection between the drive shaft 302 and pinion shaft 305.

In operation one rotates the drive shaft 302 in the direction desired. This rotation serves to rotate the valve seat 303 within the valve member 304 against the pressure of the "C" shaped torsion member 330 (the end of the heavy pin 333 within the opening 332 in the torsion member 330 moves in respect to the tabs 331 of the valve member 304 to provide a springing force—contrast FIG. 3 with FIG. 4). The rotation of the valve seat 303 within the valve member 304 connects the pressure groove 337 of the valve seat 303 with one of the surrounding C1 or C2 grooves (322 or 323 respectively) and the return groove 338 with the other of the surrounding C1 or C2 grooves. This fluid valving causes the cylinder 307 and rack 306 to move which in turn causes the pinion shaft 305 to rotate. This rotation moves the valve member 304 through the pin 317-slot 318 connection to a new neutral position, thus completing movement of the steering system. In the rare event of system failure the direct lost-motion type connection 350-351 between the drive shaft 302 and pinion shaft 305 provides a solid mechanical steering connection for the device. Note that while the fluid passage to and from the cylinder is shown in representational form as hard piping or hoses, such connections could equally well be made in total or part by passages within the body 300 of the device. This construction is shown in FIG. 5.

Through a slight reorientation of the pressure feed and/or C1 324 and C2 325 communication grooves it is possible to pressure balance the valve member 304. One way to accomplish this is to have both the C1 and C2 grooves on a single side of the valve member, each groove C1, C2 individually having roughly the same surface area X, with a substantially equal area pressure feed on the opposing side of the valve member. As shown in FIG. 5 this can be accomplished with one pressure feed seal 343 located asymmetrically down on the opposing side of the valve member 304A. By having the surface areas pressurized individually by C1 324A, C2 325A on one side of the rotor and the surface area pressurized by the pressure feed 334 on the other side of the rotor all substantially equal by such asymmetrical location of the seal the pressure on the opposing sides of the valve member 304A will be balanced during the operation of the valve regardless of whether C1 324A or C2 325A is pressurized. Note that although the embodiment of FIG. 5 is shown with the second pressure seal 344 located radially outward of the valve member 304A and with a radial pressure feed, one could equally well locate the seal 344 on the same surface as the C1 and C2 grooves. (One ideally would locate such seal 344 so near to the outer edge 345 of the valve member 304A that no additional compensation for pressurized area would be necessary in the asymmetrical location of the first pressure seal 343). Such same surface location would remove the need for the close tolerance fitting of the valve member 304A within the valve cavity 316 and allow such valve member to float as in the device of FIG. 1. The same sort of pressure balancing could be produced by moving the entire pressure feed to the side of the valve member 304A opposite the C1 324A and C2 325A grooves Again the surface area pressurized by the pressure feed would be substantially equal to the individual areas pressurized by the C1 or C2 grooves respectively so that no matter which groove C1 or C2 was pressurized one again would produce substantially equalized pressure loading on the valve member 304A.

An additional way to pressure balance the valve member is to include pressurized seals opposing the C1 and C2 commutation grooves as shown in FIG. 6. In this embodiment the commutation grooves C1 324B and C2 325B grooves are located on opposing sides of the valve member 304B. Small auxiliary passages 347 extend off of the C1 and C2 passages 348 within valve member 304B to terminate on the inner sides of certain seals 349. The seals 349 move like pistons in respect to the valve member 304B. The outer surface area of the seals 349 is substantially equal to the respective commutation area of the C1 324B and C2 325B commutation grooves. Therefor if the groove C1 324B is pressurized the pressure also pressurizes the inner sides of the corresponding seal 349 on the opposing face of the valve member 304B. Since the areas so pressurized are substantially equal, the valve member 304B is pressure balanced. The same thing happens if the groove C2 325B and its corresponding seal 349 are pressurized. As an alternative the passages 347 could pressurize equalization grooves on the opposing side of the valve member 304B instead of the seals 349. This alternative would, however, necessitate additional seals on such opposing face or a reduced efficiency due to fluid bypass (Since the pressure is fed radially of the valve member 304B such feed does not axially imbalance the valve member 304B. Such feed is therefor of no real concern. Again the location of the seals could be changed to the sides of the valve member 304B to allow it to float as in the device of FIG. 1.)

Note that in the more sublime versions of pressure balancing the valve member 304 would be pressure balance optimized for the maximum performance. For example if 75% of the time the valve member was rotated plus or minus 15 degrees in respect to the valve seat, one would select surface areas on opposing sides of the valve member to pressure balance it for this condition, accepting the limited pressure imbalance for pressure values under or exceeding the condition. Under these more sublime versions one would have differing balancing groove parameters for a race car (mostly straight line operation), a small commuter car (constant direction change) or an industrial tractor (limited periods of lock to lock direction change).

The pressure balancing of the valve member 304 reduces the wear on the device, increases the efficiency by reducing fluid leakage and otherwise improves the functioning of the device Another alternate embodiment of the device of FIG. 1 is disclosed in FIG. 7-12. In this device the valve member is connected to the drive shaft (instead of the pinion shaft as in FIG. 1) and the valve seat is connected to the pinion shaft (instead of the drive shaft as in FIG. 1). In addition, a free floating coupling ring connects the valve member to the drive shaft, the spring connection utilizes coil springs, and the valve member is of laminated plate construction.

The device of FIGS. 1-4 was shown and described as having the valve seat connected directly to the drive shaft and the valve member indirectly connected to the pinion shaft. This device could also be constructed by interchanging the interconnections of the various members. Such alternate interconnections are shown in FIG. 7. In this alternate interconnection the valve member 370 is connected to the drive shaft 400 and the valve seat 401 is connected to the pinion shaft 364. (The valve operates by rotation of the valve member in respect to the valve seat instead of vice versa as the device in FIG. 1.)

The valve member 370 is connected to the drive shaft 400 with a coupling ring 360. The free floating coupling ring 360 of this alternate embodiment is a circular ring with two pair of opposing flanges 361, 362 extending axially off the opposing sides thereof. One 361 of the pair of opposing flanges is drivingly connected to a groove 363 in the pinion shaft 364. The other 362 of the pair of opposing flanges is drivingly connected to a groove 365 in the valve member 370. As in the embodiment cf FIG. 1 this second groove 365 allows for the flanges 362 to move radially inwards and outwards of the valve member 370. This free floating coupling ring 360 performs the function of the pin 317 of the embodiment of FIG. 1 (as well as the lost motion connection as will be later described).

The spring connection 371 of this alternate embodiment utilizes two pairs 372, 373 of coil springs at opposing ends of a heavy pin 374 between the heavy pin 374 and the valve member 370. This spring connection 371 performs the function of the "C" shaped torsion member 330 of the embodiment of FIG. 34.

The valve member 370 of this alternate embodiment is of multi-plate construction As shown in FIG. 7 and in FIGS. 9-12, the valve member 370 is fabricated of a series of four plates 380,381,382,383 brazed together to form a unitary piece Four plates are formed in a selected cross-sectional pattern. The first plate 380 includes a segmented commutation ring 385 and the free floating coupling ring engagement grooves 365. The second plate 381 includes C1 and C2 grooves 386,387, passages 388 to connect the grooves C1 (386) to the commutation ring 385 in plate 380, a spring cavity 389 and a drive cavity 390. Small grooves 390a extend from the drive cavity 390 to connect such cavity to the pressure port 391. The third plate 382 is similar to the second plate 381 except that passages 392 connect the grooves C2 (387) to a commutation ring 393 in plate 383. Plate four 383 has a segmented commutation ring 393.

The multi-plate valve member 370 performs the function of the valve member 304 and of the lost-motion type connection 350-351 of the embodiment of FIG. 1. (The valve member 370 performs the function of the lost-motion connection 350-351 of transferring physical force from the drive shaft 400 through coupling ring 360 to the valve member 370 thence through the sides 402 of the drive cavity and the heavy pin 374 - valve seat 401 to the pinion shaft 364. There is no direct lost-motion connection between the drive shaft 400 and pinion shaft 364 of this alternate embodiment.)

Although this invention has been described in its preferred form with a certain degree of particularity, it is understood that the present disclosure of the preferred form has been made only way of example and that numerous changes in the details of construction and the combination and arrangement of parts may be resorted to without departing from the spirit and the scope of the invention as hereinafter claimed.

What is claimed is:

1. In a hydrostatic steering device having a valve member closely circumferentially surrounding an accompanying rotatable valve seat to form a valve for the device, and the valve member having an outer surface surrounded by a housing, the improvement of the valve member being radially free floating within the housing having no radial contact between the outer surface of the valve member and the housing so as to allow the valve member to adjust itself to the positioning of the rotatable valve seat.

2. The hydrostatic steering device of claim 1 wherein the valve extends for a certain axial length of the device and the device also having a resilient connection between the valve member and valve seat, the improvement of the resilient connection being located within the certain axial length of the valve of the device.

3. The improved hydrostatic device of claim 2 characterized in that the resilient connection comprises a heavy pin, means to connect said heavy pin to one of the valve member or valve seat for rotation therewith, and means to resiliently connect said heavy pin to the other of said valve member or valve seat.

4. The improved hydrostatic device of claim 3 wherein the device has radially inwardly extending fluid passageways and characterized in that said means to resiliently connect said heavy pin to the other of said valve member or valve seat includes a drive cavity and said drive cavity being one of the fluid passageways of the device.

5. The improved hydrostatic device of claim 1 wherein the device has a shaft means having a longitudinal axis and characterized by the addition of a connecting pin, said connecting pin having two ends, one end of said connecting pin being located in one of the valve member or the shaft means extending substantially parallel to the longitudinal axis of the shaft means, a slot, said slot being located in the other of the valve member or the shaft means and the other end of said connecting pin extending into said slot, said connecting pin rotatably connecting the valve member to the shaft means.

6. In a hydrostatic steering device having a housing containing a valve member rotatably circumferentially surrounding a shaft connected valve seat to form a valve for the device, the valve extending for a certain axial length of the device, and the device also having a resilient connection between the rotary valve member and valve seat, the improvement of the resilient connection being located within the certain axial length of the valve of the device, and the valve member being radially spaced from the housing so as to allow the valve member to adjust itself to the positioning of the valve seat.

7. A hydrostatic steering device having a housing containing a valve member rotatably circumferentially surrounding a drive shaft connected valve seat to form a valve for the device, the valve extending for a certain axial length of the device, and the device also having a resilient connection between the rotary valve member and valve seat, the improvement of the resilient connection being located within the certain axial length of the valve of the device and the valve member being radially spaced from the housing so as to allow the valve member to adjust itself to the positioning of the valve seat.

8. In a hydrostatic steering device having a housing containing a valve member rotatably circumferentially surrounding a shaft connected valve seat to form a valve for the device as well as having bearings and seals, the valve extending for a certain axial length of the device, and the device also having a resilient connection between the rotary valve member and valve seat, the improvement of the resilient connection being located within the certain axial length of the valve of the device, an the valve member being radially spaced from the housing with no bearings or seals thereabout so as to allow the valve member to adjust itself to the positioning of the valve seat.

9. A hydrostatic steering device having a housing containing a valve member rotatably circumferentially surrounding a drive shaft connected valve seat to form a valve for the device as well as having bearings and seals, the valve extending for a certain axial length of the device, and the device also having a resilient connection between the rotary valve member and valve seat, the improvement of the resilient connection being located within the certain axial length of the valve of the device and the valve member being radially spaced from the housing with no bearings or seals thereabout so as to allow the valve member to adjust itself to the positioning of the valve seat.

10. In a hydrostatic steering device having bearings, seals and a valve member closely circumferentially surrounding an accompanying rotatable valve seat to form a valve for the device, and the valve member having an outer surface surrounded by a housing, the improvement of the valve member being radially free floating within the housing having no radial contact or bearings or seals between the outer surface of the valve member and the housing so as to allow the valve member to adjust itself to the positioning of the rotatable valve seat.

11. In a hydrostatic steering device having a housing containing a valve member rotatably circumferentially surrounding a shaft connected valve seat to form a valve for the device, the valve extending for a certain axial length of the device, and the device also having a resilient connection between the rotary valve member and valve seat, the improvement of the resilient connection being located within the certain axial length of the valve of the device, and the valve member being radially spaced from the housing with nothing extending therebetween and the valve member being in radial contact with the valve seat for bearing support thereto so as to allow the valve member to adjust itself to the positioning of the valve seat.

12. A hydrostatic steering device having a housing containing a valve member rotatably circumferentially surrounding a drive shaft connected valve seat to form a valve for the device, the valve extending for a certain axial length of the device, and the device also having a resilient connection between the rotary valve member and valve seat, the improvement of the resilient connection being located within the certain axial length of the valve of the device and the valve member being radially spaced from the housing with nothing extending therebetween, and the valve member being in radial contact with the valve seat for bearing support thereto so as to allow the valve member to adjust itself to the positioning of the valve seat.

13. In a hydrostatic steering device having a valve member closely circumferentially surrounding an accompanying rotatable valve seat to form a valve for the device, and the valve member having an outer surface surrounded by a housing, the improvement of the valve member being radially free floating within the housing having no radial contact between the outer surface of the valve member and the housing with nothing extending therebetween, the valve member being in radial contact with the valve seat for bearing support thereto so as to allow the valve member to adjust itself to the positioning of the rotatable valve seat.

14. An improved hydrostatic steering device comprising a body, a shaft, bearings, said bearings extending between said shaft and said body to rotatively support said shaft, a valve seat, said valve seat being connected to said shaft for rotation therewith, a valve member, said valve member surrounding said valve seat, said valve member having an outer diameter, said outer diameter of said valve member being radially spaced from said body with nothing extending therebetween, said valve member being radially supported by said valve seat through said drive shaft to said body, and said valve member being radially spaced from said body so as to allow the valve member to adjust itself to the positioning of the valve seat.

15. The hydrostatic device of claim 14 characterized by the addition of a resilient member, said resilient member resiliently connecting said valve seat to said valve member, and said resilient connection including a "C" spring, and said "C" spring being located in said drive cavity.

16. The hydrostatic device of claim 14 characterized by the addition of a second shaft, second bearings, said second bearings rotatively supporting said second shaft to said body, and said second shaft being rotatively connected to said valve member.

17. An improved hydrostatic steering device comprising a body, said body having a cavity, a drive shaft, bearings, said drive shaft being supported by said bearings to said body, said drive shaft having a portion extending into said cavity in said body, a valve seat, said valve seat being formed on said portion of said shaft, said valve seat having an outer diameter, a valve member, said valve member having a central core and an outer diameter, said valve member being located in said cavity in said body surrounding said valve seat, said central core of said valve member being in contact with said outer diameter of said valve seat, said outer diameter of said valve member being radially spaced from said body with nothing extending therebetween, and said valve member being radially supported in respect to said body through said valve seat, said drive shaft and said bearings to said body.

18. The hydrostatic steering device of claim 17 characterized by the addition of a second shaft, said second shaft being rotatively connected to said body, and means to rotatively connect said second shaft and said valve member.

19. The hydrostatic steering device of claim 17 characterized by the addition of a resilient connection between said valve seat and said valve member, said resilient connection including a spring, and said spring being located in the space between the outer diameter of said valve member and said body of said device.

20. The hydrostatic steering device of claim 18 characterized by the addition of a lost motion connection, and said lost motion connection rotatively interconnecting said shaft with said second shaft after a certain degree of rotation therebetween.

21. An improved hydrostatic steering device comprising a body, said body having a cavity, said cavity having an axial length, a drive shaft, bearings, said drive shaft extending into said cavity in said body supported by said bearings to said body, a valve seat, said valve seat being connected to said shaft, said valve seat having an axial length, said axial length of said valve seat being substantially equal to said axial length of said cavity, said valve seat having an outer diameter, a valve member, said valve member having a central core and an outer diameter, said valve member having an axial length, said axial length of said valve member being substantially equal to said axial length of said cavity, said valve member being located in said cavity in said body surrounding said valve seat with the central core of said valve member in contact with the outer diameter of said valve seat with said valve member being radially supported in respect to said body of the hydrostatic steering device through said valve seat and drive shaft, and the outer diameter of said valve member being spaced from the body of the device with nothing extending therebetween so as to allow the valve member to adjust itself to the positioning of the valve seat.

22. The hydrostatic steering device of claim 21 characterized by the addition of a resilient connection between said valve seat and said valve member, said resilient connection including a "C" spring, said "C" spring being located in the space between the outer diameter of said valve member and said body.

23. The improved hydrostatic steering device of claim 22 characterized in that said "C" spring has an axial length and said axial length of said "C" spring being substantially equal to said axial length of said cavity.

24. The improved hydrostatic steering device of claim 22 characterized by the addition of a second shaft, said second shaft being rotatively mounted to said body, and rotative connection means to rotatively interconnect said second shaft with said valve member.

25. The improved hydrostatic steering device of claim 24 characterized in that said rotative connection allows for a radial floating of said valve member in respect to the second shaft.

* * * * *